Oct. 17, 1933.  S. G. JOHNSON  1,930,558
SETTING DEVICE FOR SCREW THREAD GAUGE
Filed May 19, 1931
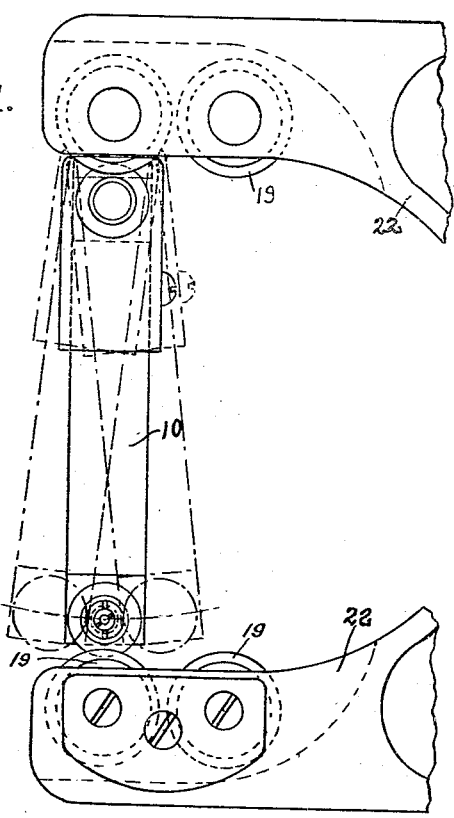
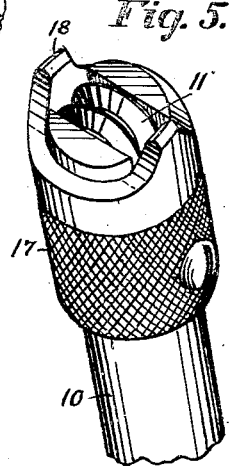
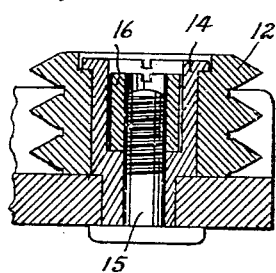
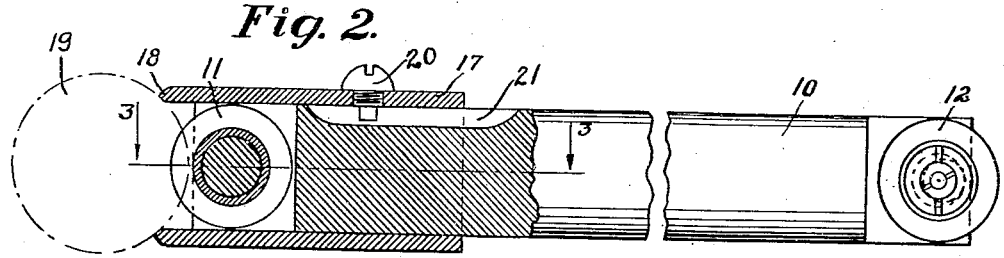
INVENTOR
Stanley G. Johnson
BY
Joseph K. Schofield
ATTORNEY Patented Oct. 17, 1933

1,930,558

UNITED STATES PATENT OFFICE 1,930,558

SETTING DEVICE FOR SCREW THREAD GAUGE

Stanley G. Johnson, Hartford, Conn., assignor to Pratt & Whitney Company, Hartford, Conn., a corporation of New Jersey Application May 19, 1931. Serial No. 538,448

6 Claims. (Cl. 33—199)

This invention relates to gauges and particularly to means for accurately testing and adjusting or setting screw thread gauges adapted for gauging external screw threads.

An object of the present invention is to provide means to determine the distance between the gauging surfaces of opposed gauging members of a gauge for external screw threads.

A feature of importance of the invention is that a setting member is provided which may be placed between and oscillated back and forth between the gauging members of a screw thread gauge with one of the gauging members as a center and which will contact with the opposed gauging member.

Another object of the invention is to provide a setting member adapted to be interposed between the serrated gauging members of an external screw thread gauge, the gauging surfaces of the setting member being in the form of annularly grooved rotatable rolls.

One advantage of the improved setting device that is of importance is that the device may be directly measured to a high precision in a standard form of linear measuring machine.

Finally it is an object of the invention to provide means to hold one end of a setting device properly positioned upon one gauging member of a screw thread gauge and extending in a direction normal thereto to properly engage the opposed gauging member of the gauge.

With the above and other objects in view, my invention consists in the features of construction and operation set forth in the following specification and illustrated in the accompanying drawing.

In the accompanying drawing annexed hereto and forming a part of this specification, my invention is shown adapted for checking a screw thread gauge of the type shown in United States patent to Johnson 1,660,335, but it will be understood that the invention can be otherwise embodied and that the drawing is not to be construed as defining or limiting the scope of the invention, the claims appended to this specification being relied upon for that purpose.

In the drawing:

Figure 1 is a side view of the setting member shown in checking positions between the gauging members of an external screw thread gauge.

Fig. 2 is a side view of the setting member partly in section.

Fig. 3 is a similar view but taken on the plane of line 3—3 of Fig. 2.

Fig. 4 is a detail sectional view of a preferred form of a contacting member at one end of the setting member, and Fig. 5 is a perspective view of one end showing the sleeve surrounding the setting member.

Briefly, and in its preferred aspect, my invention may include the following principal parts: First, a bar or rod, the length thereof being adapted for the particular size of gauge with which it is designed to be used; second, freely rotatable annularly grooved rollers mounted on parallel axes at the opposite ends of said rod or bar; third, means to adjust one of the rollers toward and from the other; and fourth, a sleeve slidable upon one end of said bar and having opposed projections on its outwardly extending and adapted to contact with a surface of the gauge being tested or adjusted.

In the use of gauges, particularly screw thread gauges, it is highly desirable that some means be provided for conveniently, quickly and inexpensively testing their accuracy. The present method employed is to adjust the gauge to properly fit over a standard external screw thread or one known to be correct. With gauges for screw threads of relatively small sizes, the expense for such standard or master screw threaded members is not burdensome. However, for gauges for larger sizes the expense for master screw threaded members becomes prohibitive. The present invention, therefore, is designed to eliminate the expense for individual master screw threaded members for checking the gauges and to provide simple and inexpensive setting members for screw thread gauges, these setting members being adapted to be accurately set to a precise and predetermined dimension in a standard form of linear measuring machine. When set the setting member may be sealed and thus kept ready for future use upon gauges of the particular form and size for which it has been once adjusted.

Referring more in detail to the figures, the setting member is shown comprising a bar or rod 10 having rotatable grooved rollers 11 and 12 upon opposite ends. One of these rollers, 11, may be mounted for free rotation upon a fixed transverse stud or shaft 13 retained by any suitable means within a recessed portion of the rod 10. The roller 11 is retained in position within the end surface of the rod 10 and maintained against axial movement upon its stud 13. The roller 11 preferably comprises two annular projections and a central groove, the dimensions of which correspond to the dimensions on the rollers of the gauge for which the setting member is made.

Upon the opposite end of the rod 10 is mounted the other freely rotatable grooved roller 12 having engaging surfaces similar to those on the opposite roller 11. This second roller 12 is mounted on a transverse axis parallel to that of the first roller 11. The groove of one roller is in alinement with a projection on the opposite roller so that the rollers at opposite ends of the rod will properly engage in intermeshing relation with the gauging members of the gauge being tested. As shown most clearly in Fig. 3, this roller 12 is mounted on a sleeve 14 outstanding from a recessed side of the rod or bar 10.

In order to permit adjustment of the distance between the engaging surfaces of the opposed rollers 11 and 12 one of the rollers, 12 in this instance, is made slightly adjustable in a direction longitudinally of the rod 10. For this purpose the construction shown and described in Johnson application Serial No. 708,725, filed April 24, 1924 for a Gauge may be employed. This is clearly shown in Fig. 4, the roller 12 shown having three projections instead of two as shown in Fig. 3. The roller 12 is rotatably mounted on a sleeve 14 having a bearing surface for the roller 12 eccentric relative to the end extending through the rod 10. A bolt 15 and nut 16 retain the sleeve 14 in any rotative position to which it may be adjusted. Due to the eccentric relation of the surfaces of the sleeve 14 for the roller 12 and for holding the sleeve in the rod 10 rotative adjustment of the sleeve 14 varies the longitudinal position of the roller 12 on the rod 10. The position of the adjustable roller 12 may be determined by direct measurement in any standard linear measuring machine by determining the distance between wires held in the grooves of the rollers 11 and 12 during the measuring operation. The setting member may, of course, be otherwise tested and adjusted as by adjusting it to a screw thread gauge for external threads known to be correct. For checking the setting member in a measuring machine by what is known as the "three wire system" the adjustable roller 12 shown in Fig. 4 having three projections and two grooves is to be preferred. Wires may be suspended within both grooves of this roller 12 which will be symmetrically disposed relative to a single wire in the single groove of the opposite roller 11. Other means such as special anvils may, however, be employed on the measuring machine for these measurements.

In order to properly retain one end of the setting member upon the screw thread gauge being tested a sleeve 17 is slidably mounted for movement along the bar or rod. This sleeve 17 may be retained upon the bar and prevented from rotation relative thereto by a screw 20. The screw 20 as shown in Fig. 2 engages within a narrow longitudinally extending groove 21 provided in the surface of the rod 10 near one end. The outer end of this sleeve is provided with projections 18 fitting the peripheries of the projections on the gauging members 19 of the gauge 22 being checked. With the sleeve 17 pressed outwardly against the roller 19 or other gauging member of the gauge being checked, the roller 11 of the setting member will be maintained properly centered. With this end of the rod 10 as a center the setting member may be swung back and forth so that the opposite roller 12 contacts with the opposite roller of the gauge. By repeated adjustments of the sleeve 14 carrying the opposite roller 12 and movements past the gauging member 19 of the gage being checked, the roller 12 may be accurately adjusted.

What I claim is:

1. A screw thread gauge setting member comprising in combination, a bar, a gauge engaging member mounted at one end of said bar, a gauge engaging member mounted at the opposite end of said bar, and a member slidably mounted upon said bar and adapted for movement into operative position at one end of the bar to engage portions of the screw thread engaging surfaces of a gauge.

2. A screw thread gauge setting member comprising in combination, a bar, a roller mounted for free rotation upon an axis transverse to the bar and located at one end thereof, a roller similarly mounted for free rotation at the opposite end of said bar, and a member slidably mounted upon said bar and adapted to engage opposite symmetrically disposed portions of the screw thread engaging surfaces of a gauge.

3. A screw thread gauge setting member comprising in combination, a bar, a roller mounted for free rotation upon an axis transverse to the bar and located at one end thereof, a roller similarly mounted at the opposite end of said bar, and an elongated member mounted to slide longitudinally on said bar and having at one end diametrically opposite projections, said projections being adapted to contact with screw thread engaging surfaces of a gauge.

4. A screw thread gauge setting member comprising in combination, a bar, a roller mounted for rotation upon an axis transverse to the bar and located at one end thereof, a similarly mounted roller upon the opposite end of said bar means to adjust the distance between said rollers, and means on said bar adapted to centrally support one of said rollers upon a screw thread engaging member of a gauge.

5. A screw thread gauge setting member comprising in combination, a bar, a roller mounted for rotation upon an axis transverse to the bar and located at one end thereof, a similarly mounted roller upon the opposite end of said bar, means to adjust the distance between said rollers, and means slidably mounted on said bar and partially inclosing one of the rollers thereon, adapted to support one of said rollers on said bar in proper gauging position upon a screw thread engaging member of a gauge.

6. A screw thread gauge setting member comprising in combination, a bar, an annularly grooved roller mounted for rotation upon an axis transverse to the bar and located at one end thereof, a similarly mounted roller upon the opposite end of said bar, means to adjust the distance between said rollers, and means on said bar adapted to support one of said rollers thereon in proper gauging position upon a screw thread engaging member of a gauge.

STANLEY G. JOHNSON.